Aug. 16, 1932.                J. B. DAVIS                    1,872,418
                        LIQUID DISPENSING APPARATUS
                    Filed Jan. 4, 1930        3 Sheets-Sheet 1
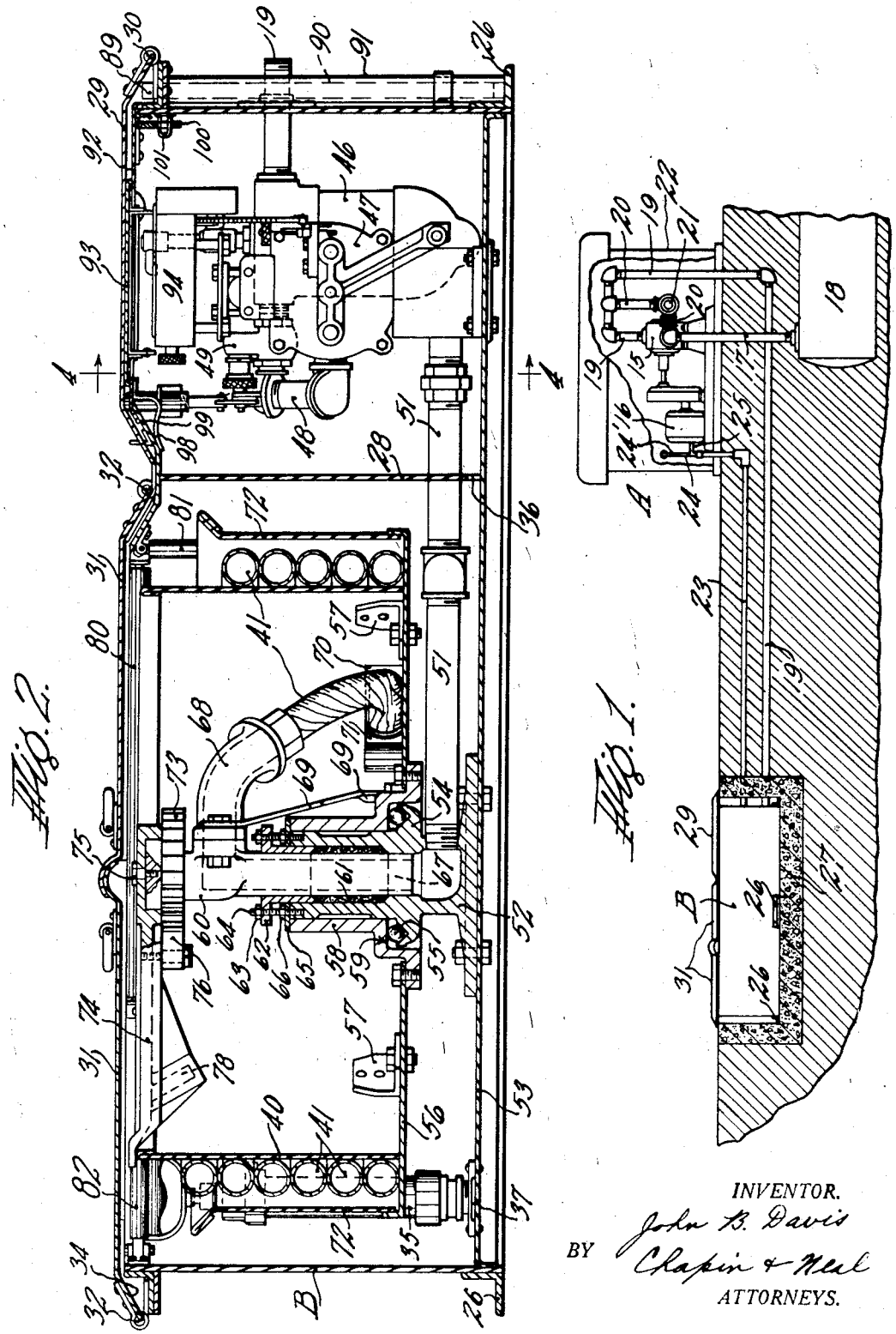
INVENTOR.
John B. Davis
BY Chapin & Neal
ATTORNEYS.

Aug. 16, 1932.　　　　J. B. DAVIS　　　　1,872,418
LIQUID DISPENSING APPARATUS
Filed Jan. 4, 1930　　3 Sheets-Sheet 2
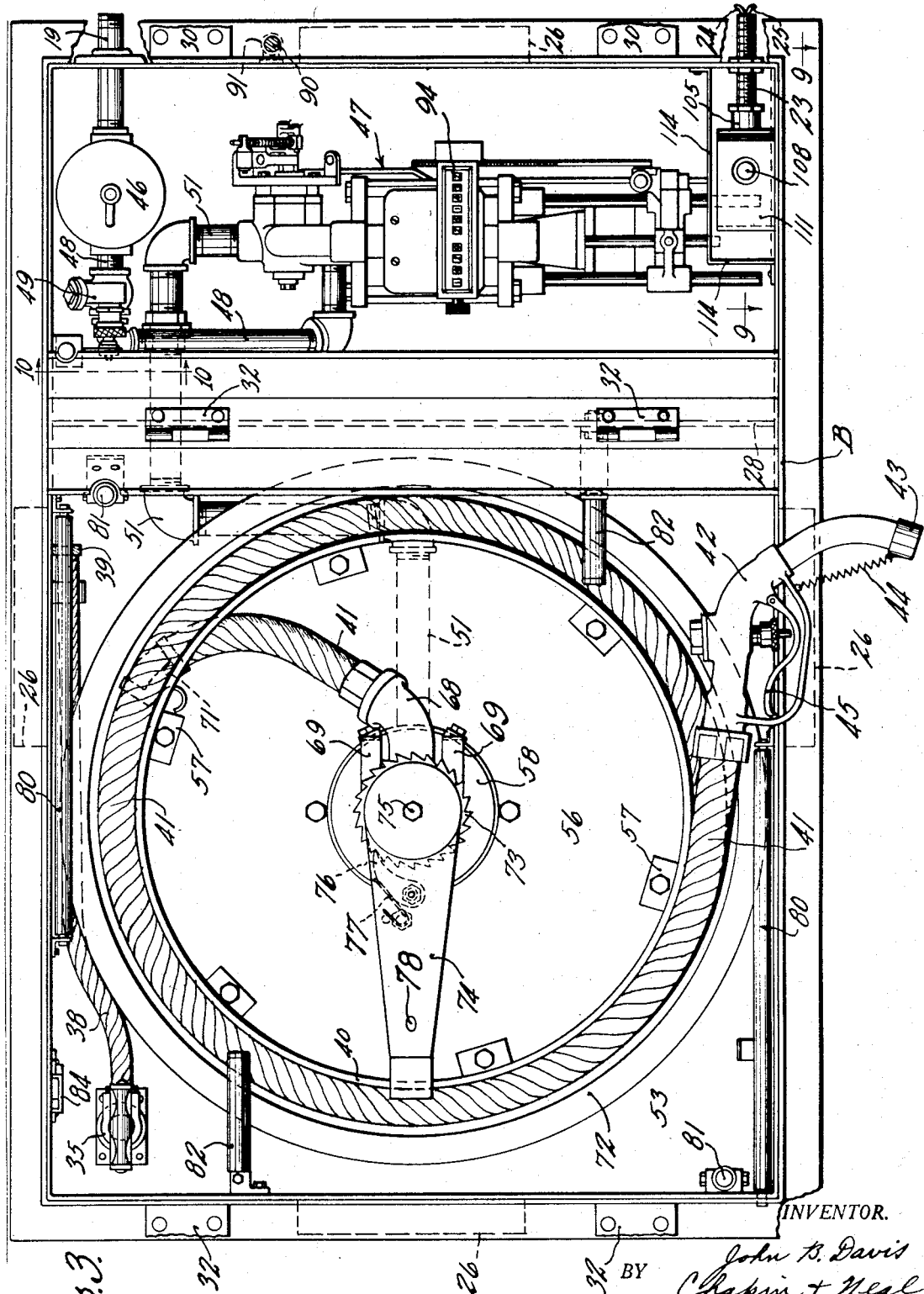
INVENTOR.
John B. Davis
BY Chapin + Neal
ATTORNEYS.

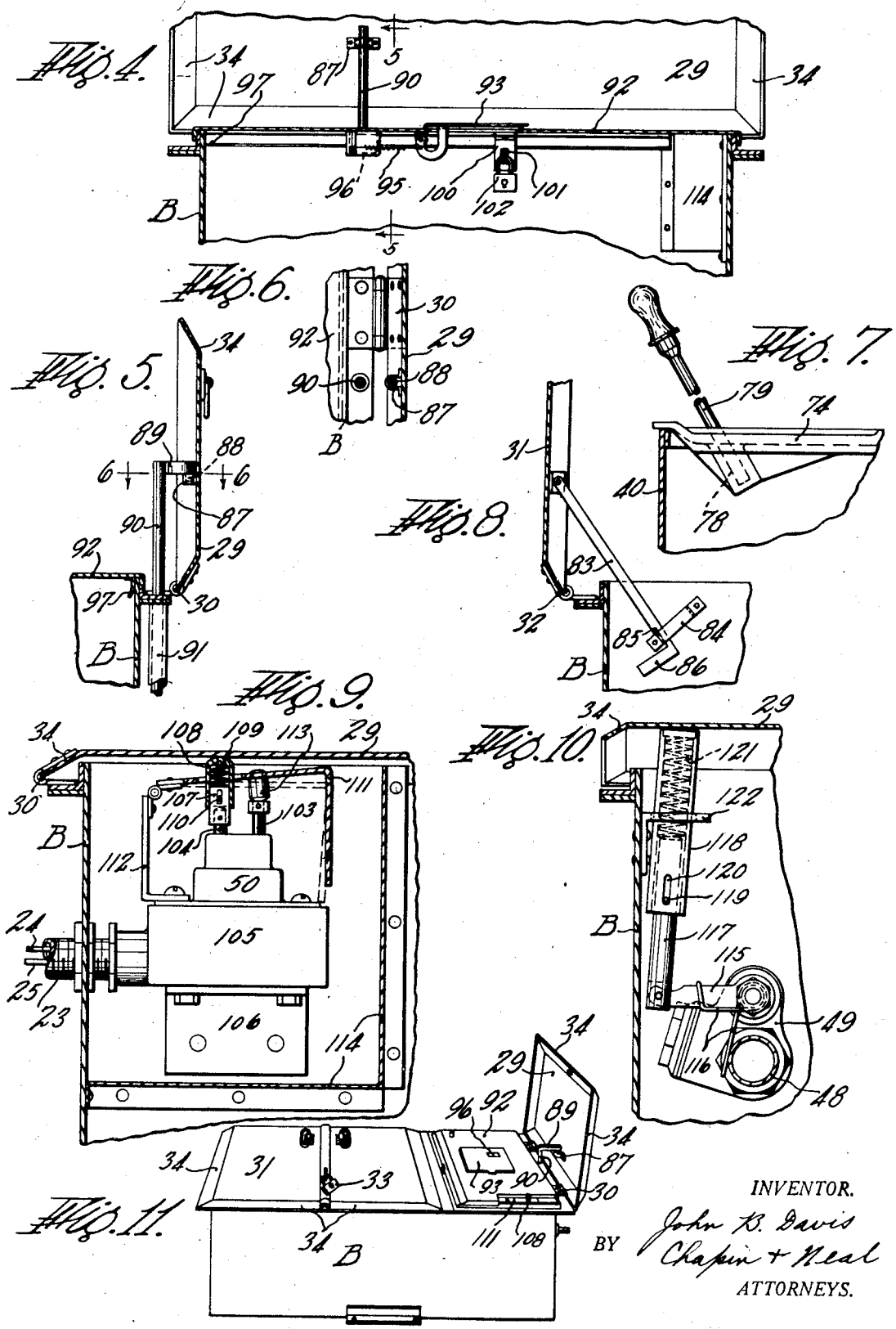

Patented Aug. 16, 1932

1,872,418

UNITED STATES PATENT OFFICE

JOHN B. DAVIS, OF SPRINGFIELD, MASSACHUSETTS, ASSIGNOR TO GILBERT & BARKER MANUFACTURING COMPANY, OF WEST SPRINGFIELD, MASSACHUSETTS, A CORPORATION OF MASSACHUSETTS

LIQUID DISPENSING APPARATUS

Application filed January 4, 1930. Serial No. 418,639.

This invention relates to improvements in liquid dispensing apparatus of a type particularly suited for dispensing liquids, such as fuel, for example, to aeroplanes.

For this class of service, it is obviously not feasible to use a dispensing apparatus of any of the common forms, such as are used for fuelling automobiles, because of the fact that they project above the ground. Therefore, resort has been had to an old but less frequently used expedient of sinking the apparatus, or at least part of it, beneath the ground. A pit is dug in the landing field and a casing containing the hose and a meter, is set into the pit. The casing has covers which when closed lie flush, or substantially so, with the ground surface and over which the aeroplane may ride without causing damage. These covers, when opened, expose a hose which is so mounted as to be readily drawn out for use in servicing the aeroplane. Pumping apparatus, preferably at a distance from the servicing pit, is provided to supply the aforesaid hose,—the quantities dispensed being registered on the meter in the usual way. The pumping apparatus is remote controlled from the servicing pit, usually by a manually operable switch, serving to stop and start an electric motor which drives the pumping apparatus.

The invention has for one object the provision of means for insuring that the pumping apparatus is stopped when the servicing operation is completed and, to that end, I provide an arrangement whereby the closing down of the covers of the servicing apparatus will open the switch of the pump motor if it has not already been opened by the operator.

The invention has for another object to provide a valve in the line between the pumping apparatus and the hose, which valve is arranged to be opened and closed by the act of opening and closing the cover of the servicing unit of the apparatus.

Another object of the invention relates to the provision in the servicing unit of the apparatus of a hose reel mounted to turn about a vertical axis and provided with means for holding the coils of the hose in proper place and preventing the hose from getting caught or entangled in any such way as to interfere with the desired freedom of withdrawal of the hose from the apparatus.

Another object of the invention is to provide in the casing of the servicing unit, a series of rolls, variously disposed and mounted to cooperate with the hose reel and prevent the hose from becoming caught on or abraded by the casing.

A further object of the invention is to provide, as a servicing unit for the apparatus, a casing divided into two compartments in one of which the hose reel and appurtenances are housed, and in the other of which the meter and control mechanism are housed, together with means for preventing access by those unauthorized, to the meter compartment except in so far as is necessary for the purpose of reading the meter or operating the pump motor switch.

A further object of the invention is to provide protective means for such switch t avoid damage to the same which might otherwise be caused when the operator uses his foot rather than his hand to operate the switch.

Other objects will appear as the detailed description proceeds and will be pointed out in the appended claims.

The invention will be disclosed with reference to the accompanying drawings, in which:—

Fig. 1 is a small scale view showing the complete dispensing apparatus;

Fig. 2 is a sectional elevational view, drawn to a larger scale and showing the servicing unit of the apparatus;

Fig. 3 is a plan view of such unit shown as it appears when the covers are opened;

Fig. 4 is a fragmentary cross sectional view taken on the line 4—4 of Fig. 2;

Fig. 5 is a sectional view taken on the line 5—5 of Fig. 4;

Fig. 6 is a sectional plan view taken on the line 6—6 of Fig. 5;

Fig. 7 is a fragmentary sectional view of the hose reel, showing the removable operating handle therefor;

Fig. 8 is a fragmentary sectional view showing the means for holding certain covers of the unit in open position;

Figs. 9 and 10 are fragmentary sectional views taken on the lines 9—9 and 10—10 respectively, of Fig. 3; and Fig. 11 is a perspective view of the servicing unit, the cover of the meter section thereof being shown in open position.

Referring to Fig. 1; the apparatus includes a pumping unit A, usually located adjacent the hangar, and a convenient number of servicing units, one of which is shown at B. The units B are distributed at convenient points about the field of the airport and preferably sunk into the ground, as indicated. The unit A is located at a distant point out of the path of travel of the airplanes.

The pumping unit may be of any suitable type. As shown, it comprises a suitable pump 15, operated by an electric motor 16. The suction side of pump 15 is connected by a pipe 17 with an underground storage tank 18 for the gasoline. The discharge line of the pump is designated 19 and extends underground to the various units B. It is usual to provide a by-pass 20 between the suction and discharge pipes with an interposed relief valve 21 which normally closes the by-pass but opens it automatically whenever the pressure in the discharge line rises above a predetermined pressure. The pumping unit is housed in by a suitable casing 22. The pumping unit is remote-controlled from the units B. To this end an underground conduit 23 connects the units A and B and through this conduit a service wire 24 extends to a switch in unit B as well as a wire 25 which connects the switch to motor 16. The other service wire 24' connects directly with the motor.

The unit B consists of an open topped box structure, preferably made of heavy gauge sheet metal and provided with angle iron feet 26 by which it may be supported on and, if desired, secured to a concrete foundation, such as shown at 27 in Fig. 1. This box structure (Figs. 2 and 3) is divided by a partition 28 into two compartments. The smaller compartment is provided with a single cover 29, hinged at 30, for closing the upper end thereof, while the larger compartment is provided with two covers 31, hinged at 32, for a like purpose. The covers 31 partially overlap in the manner as shown, to exclude water and may be padlocked together as shown at 33 in Fig. 11. All the covers have bevelled, water-shedding flanges 34 which project beyond the sides and end of the box B and render it difficult for water to enter therein when the covers are closed. For convenience in removing from box B such water as may from time to time accumulate therein, as for example while the covers are open, a hand pump 35 is fastened to the bottom wall of the box and located in one corner of the larger compartment thereof. One or more holes 36 (Fig. 2) are provided in the base of partition 28 and the bottom wall of the box should be pitched so that all water will drain towards pump 35. The intake for this pump is shown at 37 in Fig. 2 and its outlet is connected to a flexible hose 38 (Fig. 3) long enough to extend up over the top edge of the box. A removable cap 39 on the end of hose 38 is provided to exclude dirt.

The larger compartment of box B contains a reel 40 carrying a suitable length, say for example 50 feet, of hose 41. The free end of the hose carries a valved nozzle 42 of any suitable form, preferably provided with a dirt-excluding cap 43, releasably retained in place by a spring 44. The valve is of the spring closed type and is manually opened by pressing lever 45 towards the body of the nozzle.

The smaller compartment contains a suitable filter 46, the inlet of which is connected to the aforesaid pipe 19; a suitable meter 47, connected to the outlet of filter 46 by a pipe 48; a valve 49 interposed in pipe 48; and a suitable switch indicated conventionally at 50 in Fig. 9. The meter, herein shown by way of illustrative example, is of the displacement type and is or may be of the construction disclosed in my copending application for U. S. Letters Patent filed July 19, 1929, under Serial No. 379,501.

The outlet of the meter 47 is connected by piping 51 to the hollow interior of a standard 52, fixed as indicated to the bottom wall 53 of box B. The standard 52 is of substantially hollow cylindrical form with its axis vertically disposed and has intermediate its ends an external flange 54, the upper face of which is provided with a raceway to receive ball bearings 55. The hose reel 40, an open ended cylinder of sheet metal, has one end resting upon and closed by a horizontally disposed circular disc 56, to which it is secured, as by brackets 57 and the means indicated in Figs. 2 and 3. Bolted to this disc is a centrally located hollow standard 58, which has a bell mouthed lower end encompassing the flange 54. The rest of the standard 58 encompasses and is rotatably mounted on the cylindrical part of standard 52. The weight of the reel and its hose is, however, taken by the ball bearings 55, upon which the annular surface 59 of the bell mouth rests. The cylindrical lower end of a head 60 extends into the hollow interior of the stationary standard 52 and the joint between these two elements is rendered liquid tight by a stuffing box 61, the gland 62 of which is adjustably held in place by nuts 63 on studs 64 secured to the upper end of standard 52. An annular disc 65, resting upon the upper end face of standard 52 overlaps the joint between it and standard 58 and is secured by nuts 66 on studs 64.

The head 60 has a cored passage 67 therein, the outlet end of which communicates with a special elbow 68, which is bolted to one side of the head and to which one end of hose 41 is secured as clearly shown in Figs. 2 and 3. The upper part of head 60 is connected to the bell mouthed lower end of standard 58 by braces 69. The hose extends from the interior of the reel to its external drum surface through the hole 70 shown in Fig. 2. A metal guard 71 is provided on the hose to prevent chafing on the walls of this hole.

Secured to the disc 56 is a second cylinder 72 which encompasses the reel 40 in spaced and concentric relation therewith. The hose 41 is coiled in the space between the members 40 and 72 and the radial dimension of this annular space is such as to prevent one coil of the hose slipping down past the other. The arrangement keeps the coils of the hose in proper superposed relation. The upper end of cylinder 72 is preferably bell mouthed as shown in Fig. 2, to facilitate entry of the hose into the aforesaid space and also to prevent abrasion of the hose.

The hose may be unwound simply by pulling on the nozzle end thereof. To wind up the hose, a lever operated pawl and ratchet mechanism is provided. A ratchet 73 is fixed on the upper end of the head 60. A lever 74 is provided at one end with a hollow hub which encompasses the hub of ratchet 73 and can turn thereon. The lever is held in place by a stud 75 passing through the closed upper end of its hollow hub and threaded into ratchet 73. Pivotally mounted on the under side of lever 74 is a pawl 76, the free end of which is urged into engagement with the teeth of the ratchet by a spring 77 (Fig. 3). The outer end of the lever is supported by resting on the upper edge of reel 40. A socket 78 is provided in lever 74 into which, when covers 31 are opened, a rod 79 may be thrust, as shown in Fig. 7. This rod forms a convenient means for oscillating the lever.

In order to prevent the hose 41 from being chafed when pulled into or out of box B, rollers 80 are provided which prevent the hose from rubbing on the upper side edges of the box. Small rolls 81, hinged to swing about a horizontal axis, are provided one at each of two diagonally opposite corners of the hose reel compartment. These rolls 81 are swung up into vertical position when covers 31 are opened and serve to prevent the hose from rubbing on the covers 31 while it is being drawn over rollers 80. Other rolls 82, with their axes horizontally disposed are provided to project over the hose coiling space of the reel and prevent upthrow of the hose. These rolls 82 may be fixed, as in the case of the right hand one shown in Fig. 3, or they may be mounted to swing about a vertical axis as shown in connection with the left hand roll.

The covers of the box may be held in open position by any suitable means. As illustrative examples, either of the means shown (one in Fig. 5 and the other in Fig. 8) may be used. In the arrangement shown in Fig. 8, a brace 83 pivotally connected to the inside of the cover 31, slides in a slot afforded by a strap 84 fixed to one side wall of box B. Brace 83 is notched to provide a shoulder 85 to engage the top of strap 84 and prevent the cover from moving inwardly and also with a bent end 86 to engage the bottom of the strap and limit the degree to which the cover can be opened. The cover 29 carries, on its inner side, a strap 87 to receive a pin 88 which depends from an arm 89 fixed on the upper end of a rod 90. Rod 90 is mounted to slide and turn in a vertical cylinder 91 fixed to one end of box B. The arm 89, after being lifted enough to withdraw pin 88 from strap 87, is turned ninety degrees from the position shown in Fig. 5 and pushed down in tube 91, after which the cover can be closed.

The small compartment is also provided with a flanged inner cover 92 which is locked in place and prevents access to all parts except the valve and switch operating means and the register of the meter. The latter is normally concealed by a small, self closing lid 93 which is pivoted to cover 92, as best shown in Fig. 4. The arrangement is such that the lid can be raised far enough to enable reading of the register 94 and so that the back edge of the lid will strike cover 92 and limit the extent of opening of the lid so that spring 95 will close the lid when the same is released. A depression 96 is formed in lid 93 to receive strap 87 when cover 29 is closed. The cover 92 is provided along one side edge with a downturned flange 97 which engages the adjacent face of box B and serves to hold the cover in place. The cover also has fixed to its inner face along the opposite side a projection 98 (Fig. 2). In applying the cover 92, projection 98 is first slid in under the bevelled wall 99 of box B, after which the cover is lowered into place. When cover 92 has been thus seated, it may be locked in place by swinging a hasp 100, fixed to the inside of the cover, over the staple 101 and passing a padlock 102 through the staple. Access to the hasp and padlock may be had by opening lid 93.

Referring now to Fig. 9, the switch 50 is of the push button type having "On" and "Off" buttons 103 and 104, respectively. The switch is mounted in a condulet fitting 105, which is bolted to an underlying angle iron bracket 106, fixed to a wall of box B. To the button 104 is fixed a plunger 107, having its upper end telescoped in a tube 108. A spring 109 tends to separate the plunger and tube, and they are limited in their relative movement by the pin and slot connection 110 between them. The arrangement is such that the switch 50, if not opened manually prior to the closing of cover 29, will be automatically opened by the act of closing the cover because the member 108, when switch 50 is open, will project above the upper edge of box B sufficiently to be engaged by cover 29 during its final closing movement and be moved to the "Off" position shown in Fig. 9. The spring 109 yields, if necessary, after button 104 has been moved to closed position, to permit the cover 29 to be tightly closed without working injury to the mechanism of switch 50. The switch 50 is closed by the operator pressing on button 103. The tendency is for the operator to do this with his foot by stepping on the top of button 103. Since such practice is liable to injure the switch, means are provided to prevent undue pressure from being transmitted to the switch mechanism. A right angularly bent place 111, hinged to a bracket 112 fixed to condulet 105, carries on the under side of its horizontal part a button 113 to engage button 103. The vertical part of member 111 is adapted to engage the condulet 105 to restrict its downward movement to that necessary for the purpose. The operator can step on member 113 without damaging the switch because the pressure is transmitted to the member 105 which is rigidly supported on bracket 106, fixed to box B. The switch mechanism is preferably housed in by walls 114 which, with parts of box B, form an open-topped switch compartment, closed only by cover 29,—cover 92 being cut away as indicated in Fig. 11.

The valve 49 is arranged to open and close automatically with the opening and closing of cover 29. Referring to Fig. 10, the valve has an operating lever 115 which is urged towards open position by a torsion spring 116. As shown, the valve is closed. To the free end of lever 115 is pivotally connected the lower end of a plunger 117. A tube 118, closed at its upper end, has its lower end telescoped over the upper end of plunger 117 and such end is held to the plunger by a pin 119 which rides in a vertical slot 120 in the tube. A spring 121, housed in the tube and interposed between the closed upper end thereof and the top of plunger 117, tends to lift the tube to the limit permitted by the engagement of pin 119 with the lower end of slot 120. The tube 118 is slidably received in a bracket 122. The tube and plunger are substantially vertically disposed and, when cover 29 is open or partially open as shown, the plunger tube 118 is lifted by spring 116 so as to project above the upper edge of box B. The valve 49 is then open. On closing down cover 29, the latter will engage the top of tube 118 and move it and plunger 117 downwardly until valve 49 is closed. Any further closing movement of the cover will simply move tube 118, the spring 121 yielding to permit such action.

The operation of the apparatus will now be described. Normally, the covers 29 and 31 of the servicing unit B are closed so as to offer no obstruction to the aeroplanes. In such condition of the apparatus, the switch 50, controlling the electrically operated pumping apparatus A, is held in open position by cover 29. Also, valve 49 is held tightly closed. When an aeroplane is to be serviced, the covers 29 and 31 are raised. The raising of cover 29 causes valve 49 to be opened and gives access to switch 50, which is manually closed, whereupon the pumping apparatus is started. The hose 41 is then pulled out of the casing B, the reel turning readily on its ball bearings and the hose being protected as it is drawn out, from abrasion by the rolls 80 and 81. After the hose has been drawn out and the nozzle 42 inserted in the fuel tank of the aeroplane, the operator presses on lever 45 and opens the nozzle valve. The tank filling operation is controlled at the hose nozzle and, when completed, the operator relaxes his grip on lever 45, allowing the nozzle valve to close. He then winds up hose 41 on the reel by means of lever 74, and the pawl and ratchet mechanism operated thereby. The quantity dispensed may be ascertained by reading the dial of the meter which may be done by opening the lid 93 of the inner cover 92. The covers 29 and 31 are then closed and the closing of cover 29 will serve to close valve 49 and also to open switch 50 in case the operator has not already done so.

The invention has been disclosed herein, in an embodiment at present preferred, for illustrative purposes, but the scope of the invention is defined by the appended claims rather than by the foregoing description.

What I claim is:

1. In combination, a casing, a dispensing hose housed therein, a pumping apparatus remotely located from said casing and piped up to said hose, a valve located in said casing and interposed in the line to said hose, means in said casing for starting and stopping said apparatus, means for operating said valve including a plunger and yieldable means for projecting it upwardly in said casing and for opening the valve, a cover for said casing operable when moved into closed position to actuate the first named means and stop said apparatus and also operable to engage said plunger and move it against the force of said yieldable means to close said valve.

2. In combination, a casing, a dispensing hose housed therein, an electrically controlled means remotely located from the casing for forcing fluid through said hose, a switch including push buttons located in said casing and arranged to start and stop said means, and a foot depressible protecting plate associated with and above the switch and by which one of said buttons is depressed, means restricting the extent to which the operator can depress said plate and move such button to that necessary for operation of said switch, said plate having an opening through which the other button projects in position for depression by the foot of the operator and serving to limit the extent to which such last named button can be thus depressed.

3. In combination, a casing, a dispensing hose housed therein, electrically controlled means remotely located from the casing for forcing fluid through said hose, a push button switch to start and stop said means, an open topped enclosure in said casing for said switch, means for rigidly supporting the switch from the casing, a hinged plate having a horizontal part serving to substantially close the top of the switch enclosure and overlying the "On" button of said switch and adapted to depress the same, said plate having an opening through which the "Off" button extends and a vertical part adapted to engage and be arrested by said supporting means when the "On" button has been depressed to the proper extent.

4. In combination, a casing, a dispensing hose housed therein, electrically controlled means remotely located from the casing for forcing fluid through said hose, a push button switch to start and stop said means, an open topped enclosure in said casing for said switch, means for rigidly supporting the switch from the casing, a hinged plate having a horizontal part serving to substantially close the top of the switch enclosure and overlying the "On" button of said switch and adapted to depress the same, said plate having an opening through which the "Off" button extends and a vertical part adapted to engage and be arrested by said supporting means when the "On" button has been depressed to the proper extent, and a cover for said casing effective when closed to engage and depress said "Off" button unless the same has already been moved to "Off" position.

5. In combination, an open topped casing, a cover for the top of said casing, a hose reel housed in said casing and comprising a drum mounted to turn about a vertical axis, a hose coiled about the outer periphery of said drum, and a second drum fixed to the first and cooperating therewith to form an annular hose receiving space of a radial width less than twice the diameter of the hose.

6. In combination, an open topped casing, a hose reel housed therein and mounted to turn about a vertical axis, covers hinged to two opposite top edges of said casing, rolls mounted along the other edges of said casing to protect the hose from abrasion thereby as it is drawn in and out of the casing, and other rolls mounted in said casing to be swung from a normal inactive position into a substantially vertical position, the last named rolls being so located as to prevent the hose from rubbing on the edges of the covers as it is drawn in and out of said casing.

7. A dispensing apparatus, comprising, a casing, a dispensing hose, electrically controlled means for forcing fluid through said hose, a push button switch to start and stop said means, means rigidly supporting said switch from said casing, a movable plate having a part overlying the "On" button of said switch and adapted to depress the same, said plate having an opening through which the "Off" button extends and a part adapted to engage and be arrested by said supporting means when the "On" button has been depressed to the proper extent.

8. A dispensing apparatus, comprising, a casing, a dispensing hose, electrically controlled means for forcing fluid through said hose, a push button switch to start and stop said means, means rigidly supporting said switch from said casing, a movable plate having a part overlying the "On" button of said switch and adapted to depress the same, said plate having an opening through which the "Off" button extends and a part adapted to engage and be arrested by said supporting means when the "On" button has been depressed to the proper extent, and a cover for the casing operable by its closing movement to engage and depress the "Off" button unless the same has already been moved to "Off" position.

In testimony whereof I have affixed my signature.

JOHN B. DAVIS.